(12) United States Patent
Matsui

(10) Patent No.: US 9,660,548 B2
(45) Date of Patent: May 23, 2017

(54) RECTIFICATION DEVICE FOR IMPROVED SHORT-CIRCUIT PROTECTION

(71) Applicant: Mitsubishi Electric Corporation, Tokyo (JP)

(72) Inventor: Kota Matsui, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 14/906,082

(22) PCT Filed: Jan. 9, 2014

(86) PCT No.: PCT/JP2014/050224
§ 371 (c)(1),
(2) Date: Jan. 19, 2016

(87) PCT Pub. No.: WO2015/049882
PCT Pub. Date: Apr. 9, 2015

(65) Prior Publication Data
US 2016/0172996 A1 Jun. 16, 2016

(30) Foreign Application Priority Data

Oct. 4, 2013 (JP) .................................. 2013-208735

(51) Int. Cl.
*H02M 7/06* (2006.01)
*H02M 1/42* (2007.01)
(Continued)

(52) U.S. Cl.
CPC ........... *H02M 7/06* (2013.01); *H02M 1/4233* (2013.01); *H02M 3/1588* (2013.01);
(Continued)

(58) Field of Classification Search
CPC ...................................................... H02M 7/06
See application file for complete search history.

(56) References Cited

U.S. PATENT DOCUMENTS

2012/0014139 A1\* 1/2012 Yamada .............. H02M 1/4208
363/17
2012/0294054 A1\* 11/2012 Kim ........................ H02J 17/00
363/126

FOREIGN PATENT DOCUMENTS

| JP | 07-115774 A | 5/1995 |
| JP | 11-356051 A | 12/1999 |
| JP | 2002-017087 A | 1/2002 |

OTHER PUBLICATIONS

International Search Report for PCT/JP2014/050224 dated Apr. 22, 2014.

\* cited by examiner

*Primary Examiner* — Emily P Pham
(74) *Attorney, Agent, or Firm* — Sughrue Mion, PLLC; Richard C. Turner

(57) ABSTRACT

A rectification device equipped with: a rectification circuit wherein switch elements are on the two sides adjacent to the side of an AC power source on which a feedback current flows, and the other two sides are rectification elements; an input voltage detector; an input current detector; and a control circuit that modulates the pulse width to control the switch elements in response to the difference between the input current and an input current target value generated on the basis of a synchronized sine wave synchronized with the input voltage. When the polarity of the input voltage, the input current, or the synchronized sine wave differs from the polarity of the other two, the two switch elements are switched simultaneously. Thus, it is possible to prevent circuit damage in the rectification device and to reduce the power factor even when there is a possibility of short-circuiting in the AC power.

5 Claims, 12 Drawing Sheets

(51) Int. Cl.
*H02M 1/00* (2006.01)
*H02M 3/158* (2006.01)
(52) U.S. Cl.
CPC .... *H02M 2001/0009* (2013.01); *Y02B 70/126* (2013.01); *Y02B 70/1466* (2013.01)

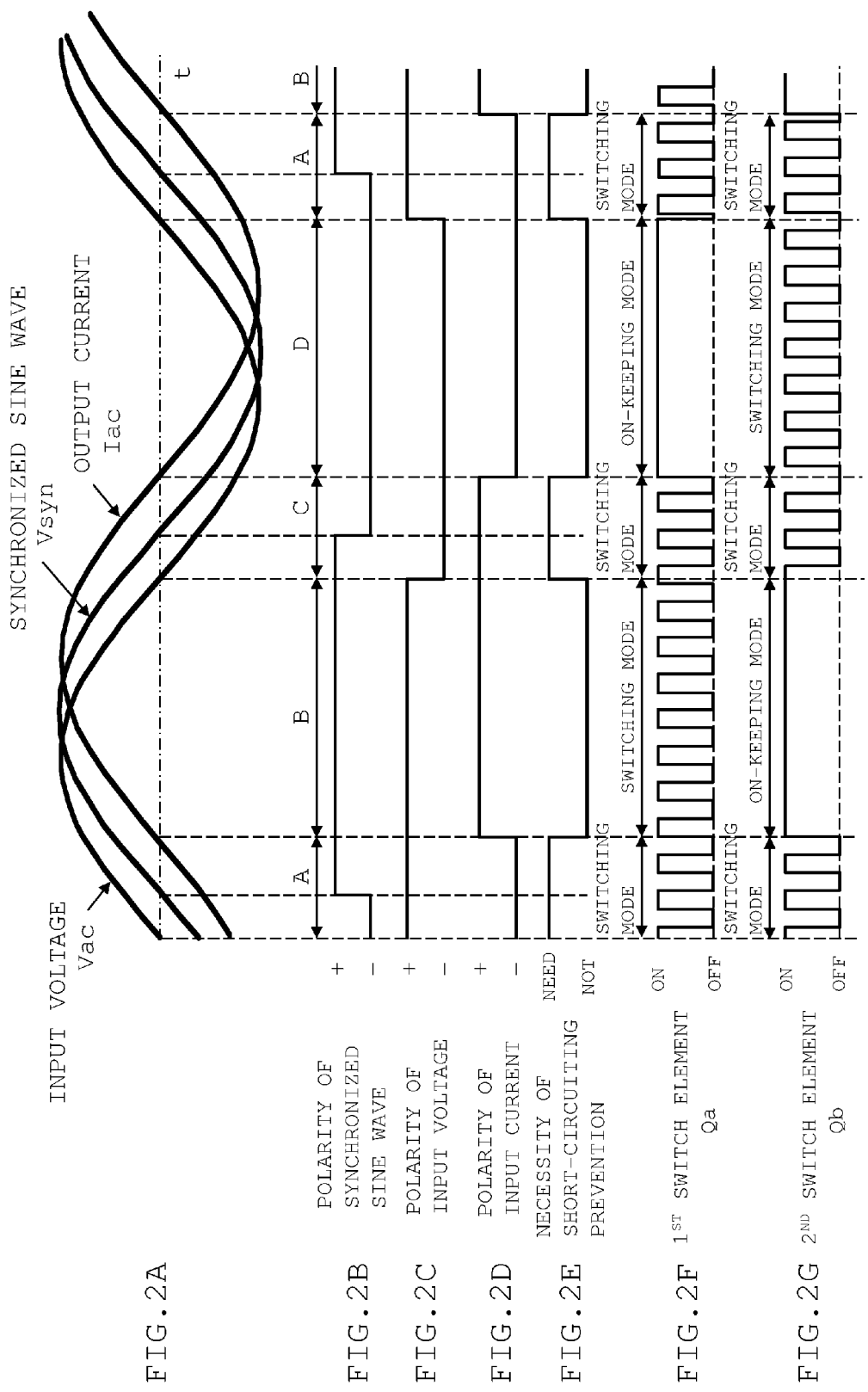

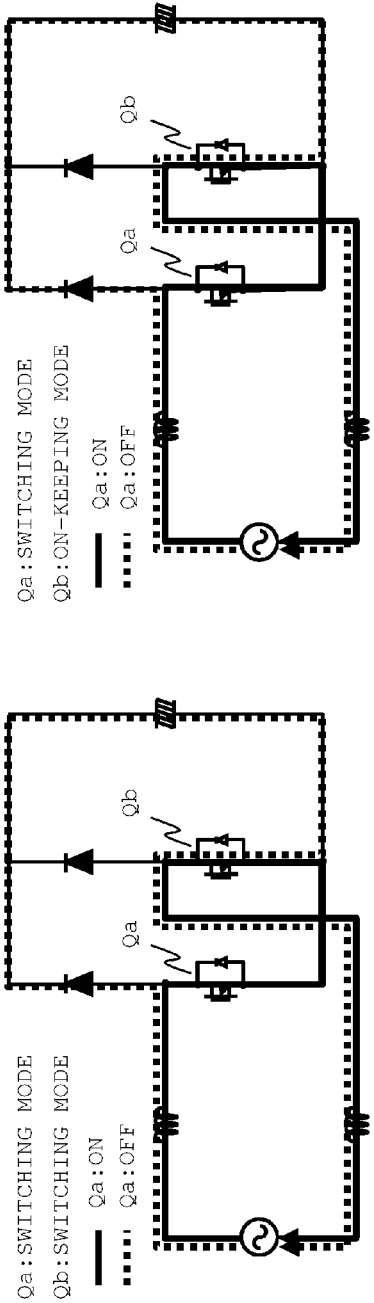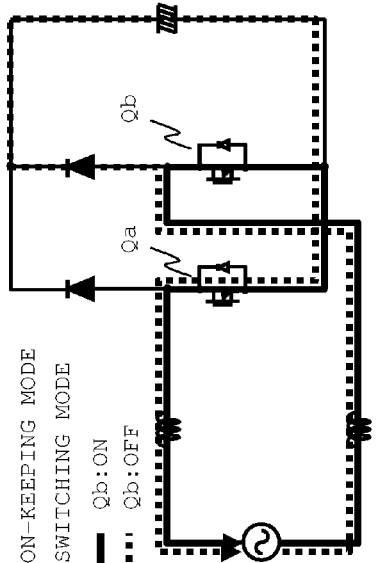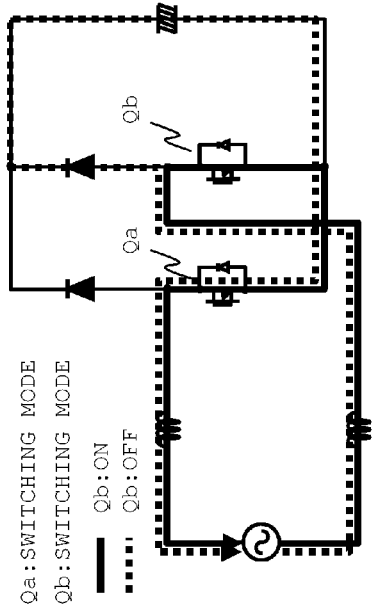
FIG.3A  FIG.3B  FIG.3C  FIG.3D

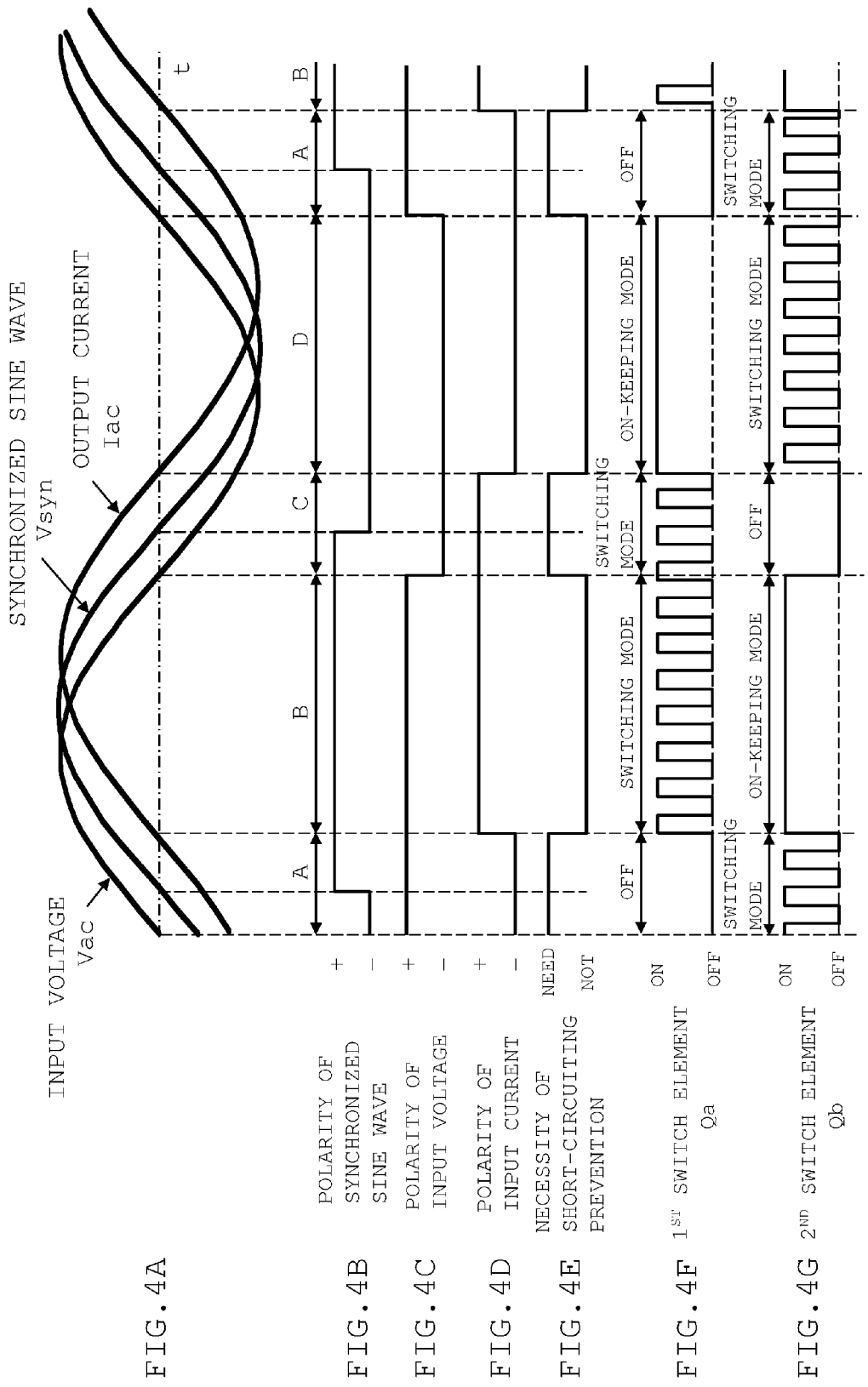

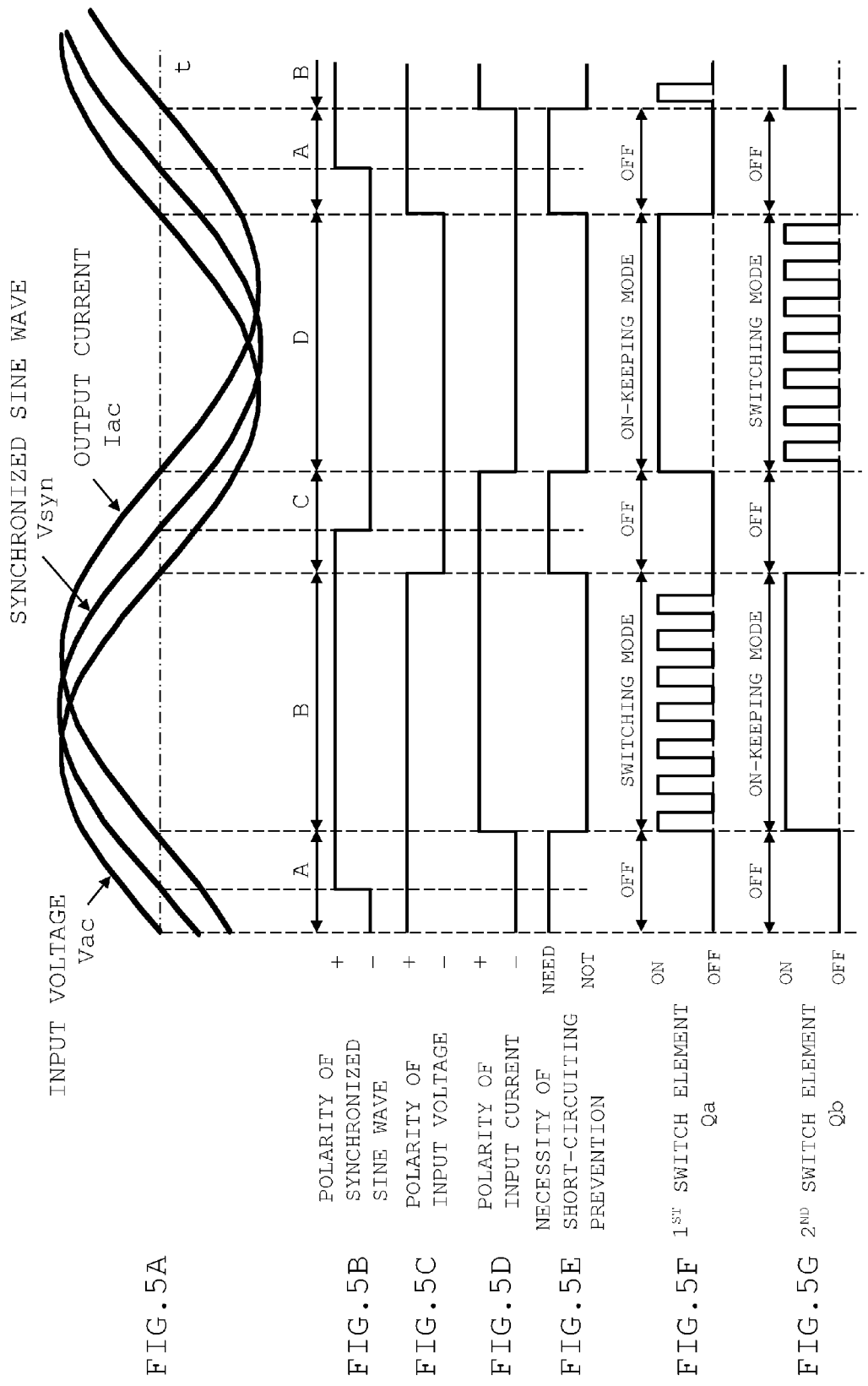

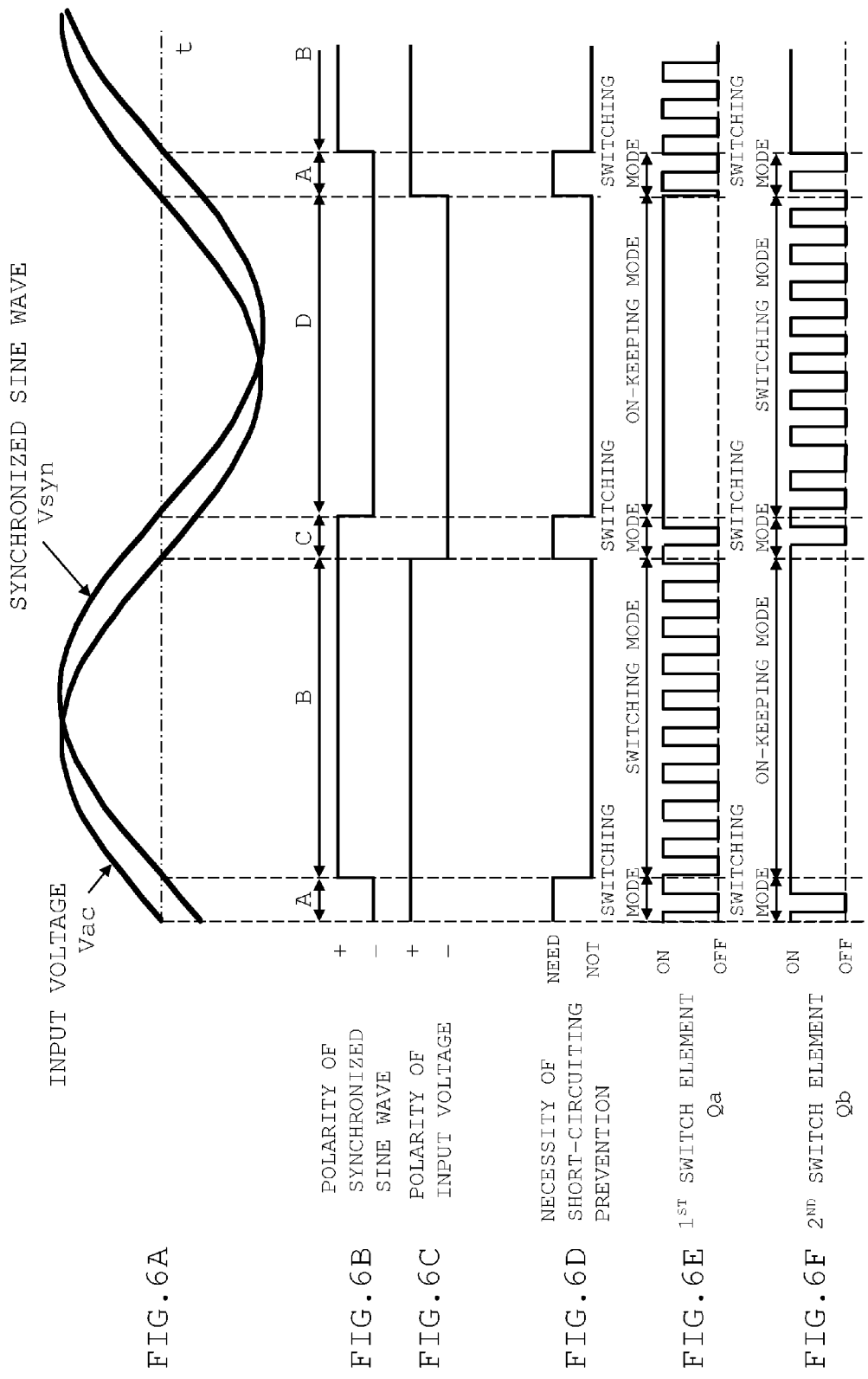

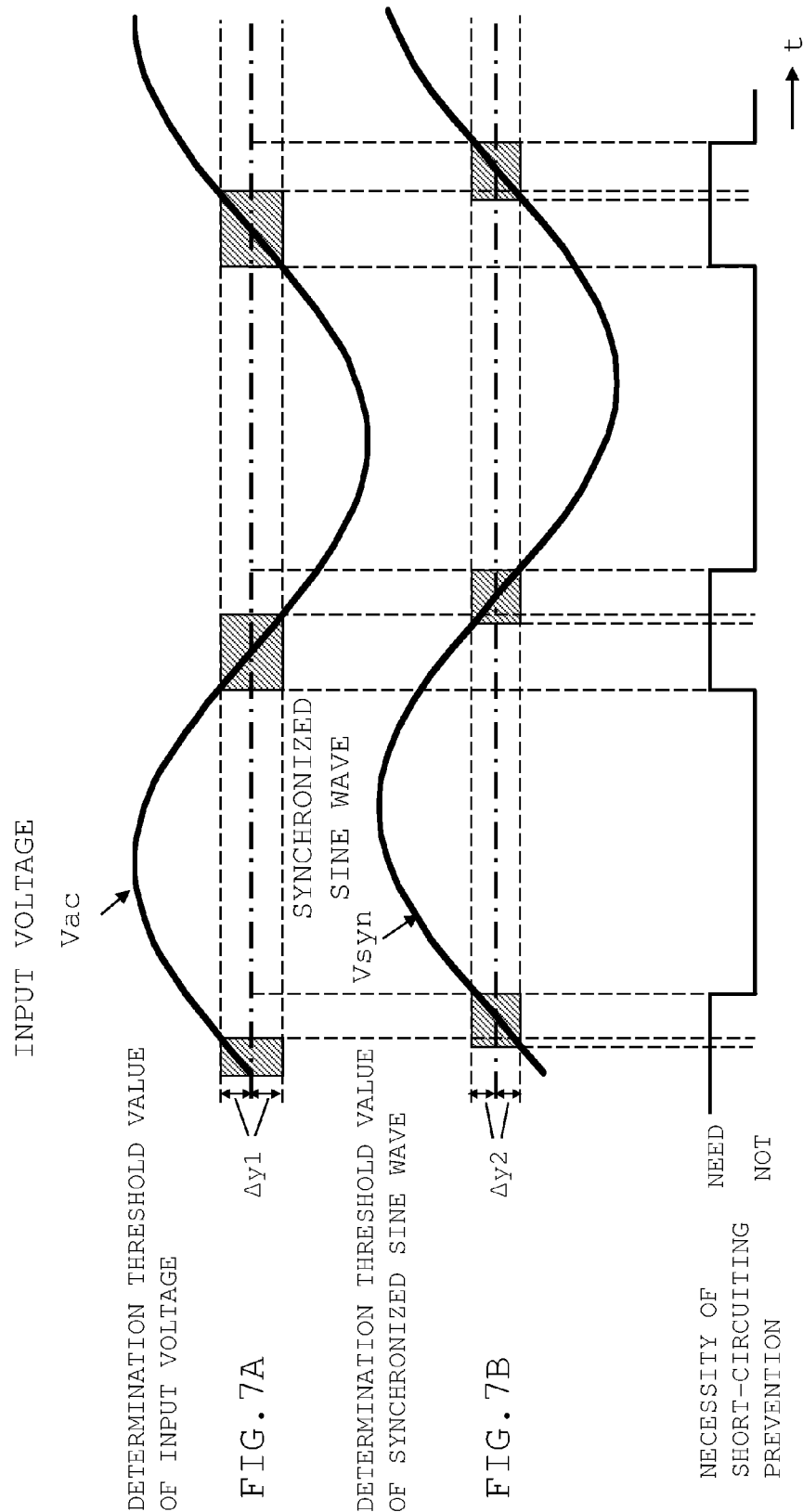

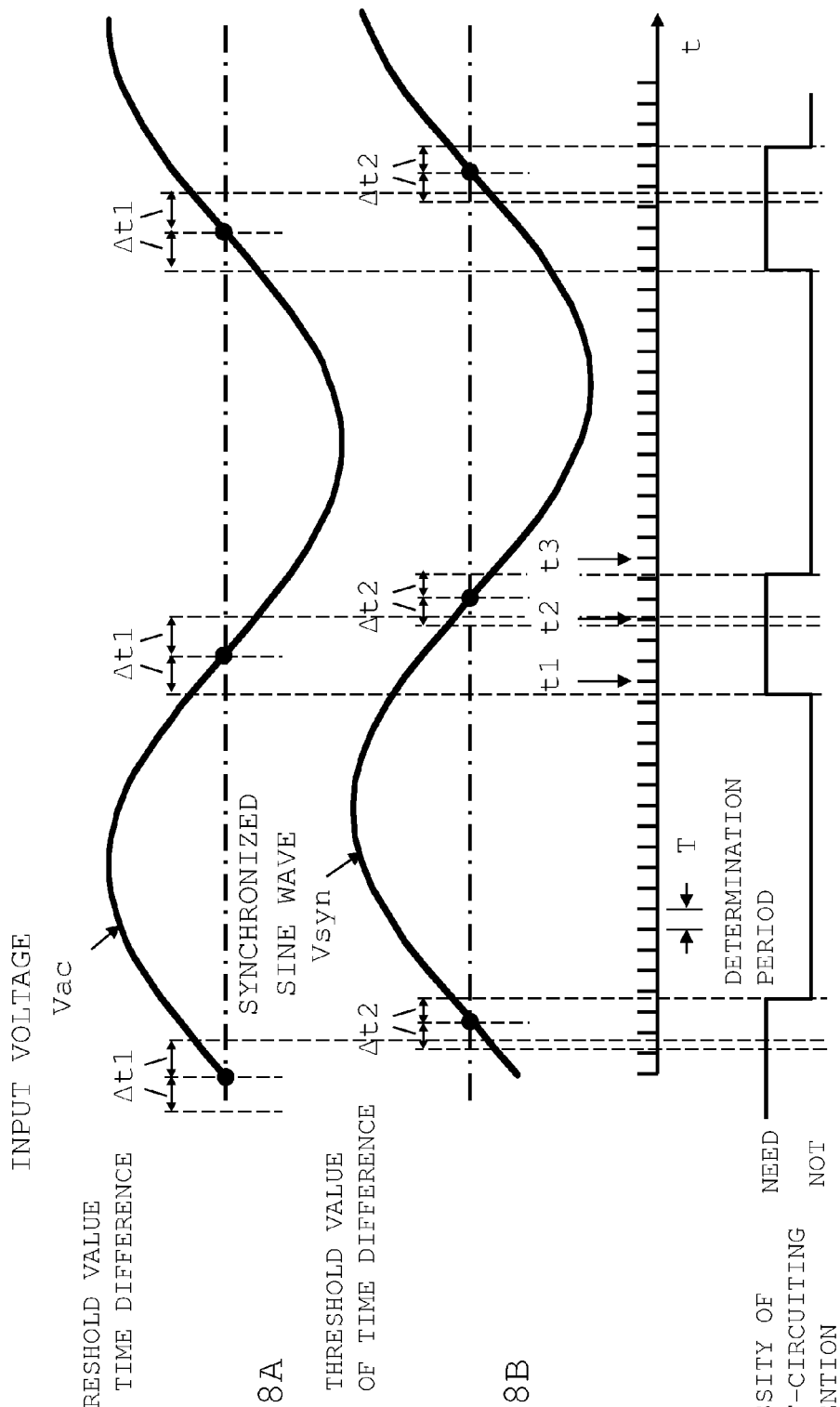

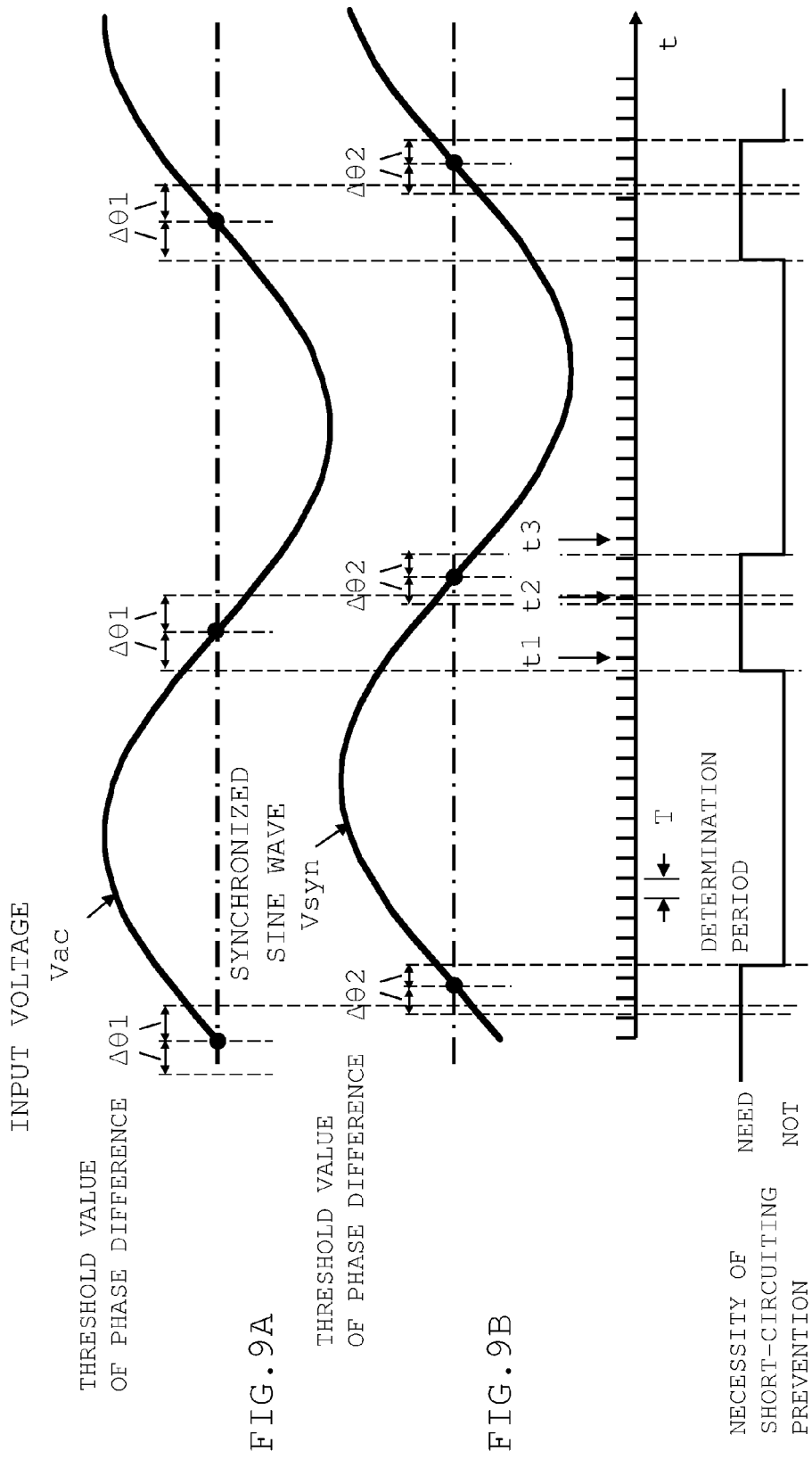

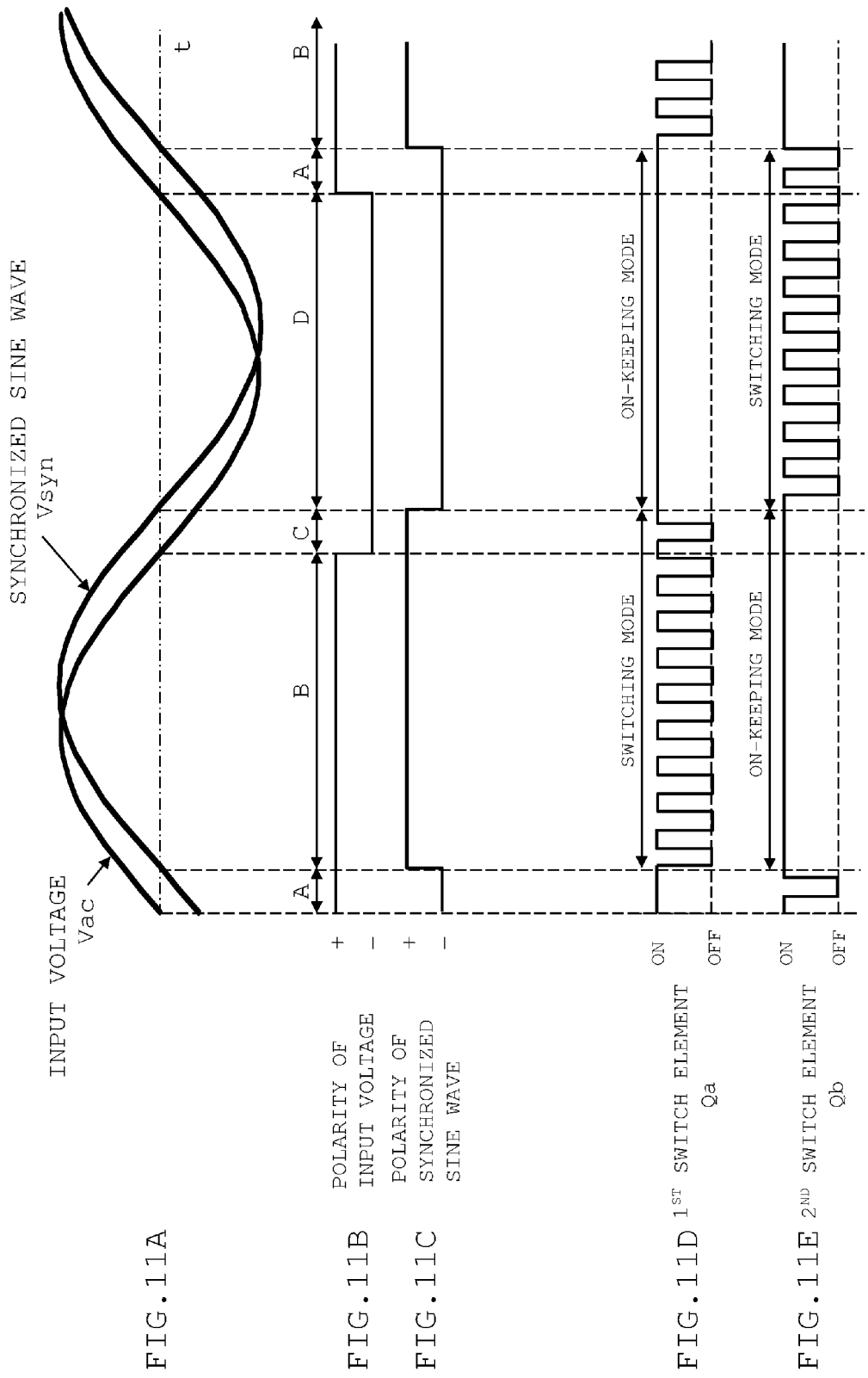

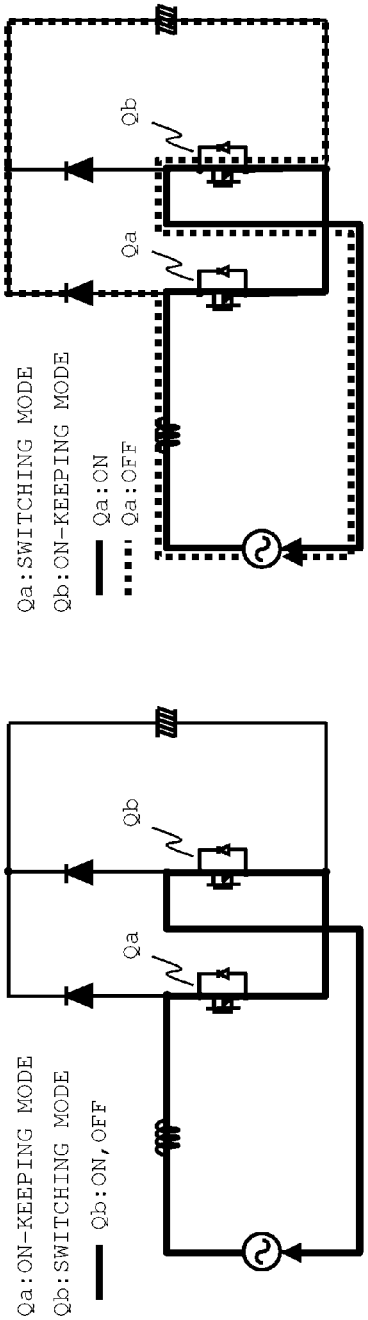
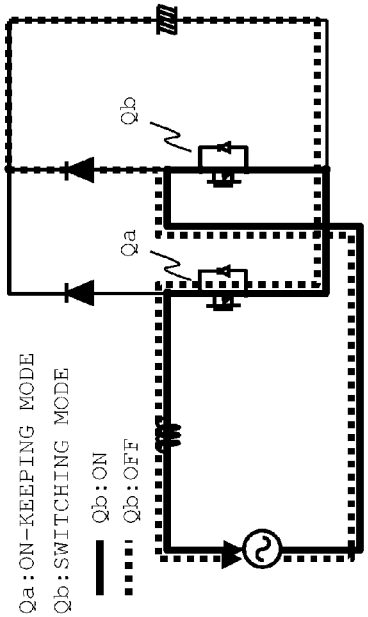
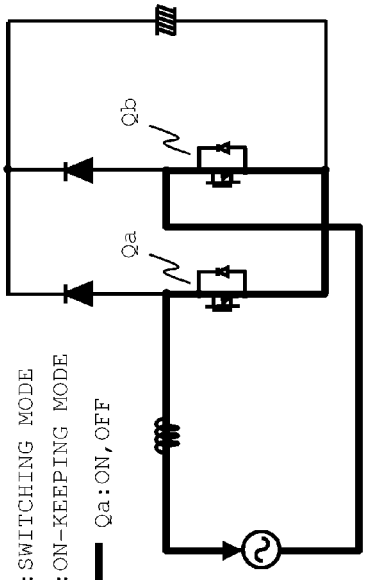
FIG.12A  FIG.12B  FIG.12C  FIG.12D

RECTIFICATION DEVICE FOR IMPROVED SHORT-CIRCUIT PROTECTION

CROSS REFERENCE TO RELATED APPLICATIONS

This application is a National Stage of International Application No. PCT/JP2014/050224 filed Jan. 9, 2014, claiming priority based on Japanese Patent Application No. 2013-208735 filed Oct. 4, 2013, the contents of all of which are incorporated herein by reference in their entirety.

TECHNICAL FIELD

The present invention relates to a rectification device which performs current control by switching control and converts alternating current (AC) power into direct current (DC) power.

BACKGROUND ART

A conventional rectification device which converts AC power into DC power is configured such that, for example, a load is arranged on an output stage of a bridge type full wave rectification circuit composed of four diodes; a choke coil and a diode are connected in series to the load; and a resistor and a smoothing capacitor, which are connected in series to a switch element, are arranged in parallel to the load; and DC output power is supplied to the load. Then, the rectification device detects a current flowing through the resistor to control the switch element at a predetermined pulse width based on the result of the detection, and thus improves a power factor of the rectification device.

However, a problem exists in that conversion efficiency deteriorates due to loss of the diode and the like in the rectification device; and in a rectification device equipped with a power factor correction (PFC) circuit, two of four rectification elements that form the bridge type are replaced with switch elements in order to improve a power factor. For example, in a power supply device of PTL 1 shown in FIG. 10, two rectification elements on the side through which a feedback current of a bridge type full wave rectification circuit flows are replaced with switch elements 4a, 4b, respectively; a smoothing capacitor 5 provided on the next stage of the rectification circuit is connected to an AC input power source 1 via a choke coil 2; and a control circuit 6 that controls the operation of the switch elements 4a, 4b is provided so as to detect an input voltage, an output voltage, and currents flowing through the switch elements 4a, 4b. The control circuit 6 discriminates between an upper wave side portion and a lower wave side portion of a line input voltage, operates the switch elements 4a, 4b respectively according to the discrimination, and properly controls the pulse widths of the switch elements so that a line input current becomes a sine wave AC current having the same phase as the phase of the line input voltage. As described above, in a so-called bridgeless PFC in which two rectification elements through which the feedback current of the bridge type full wave rectification circuit flows are respectively replaced with the switch elements and the control circuit properly controls the switch elements, thereby improving the power factor, the number of components can be reduced and conversion efficiency and reliability can be improved.

CITATION LIST

Patent Literature

PTL 1: JP 07-115774 A

SUMMARY OF THE INVENTION

Problems to be Solved by the Invention

However, in the power supply device of PTL 1, a switching mode period and an on-keeping mode period of the semiconductor switch elements are switched according to the polarity of the input voltage; and accordingly, the input voltage needs to be detected. When a detection circuit is provided to detect the input voltage, a signal transmission delay time is generated in the detection circuit. This generates a deviation in the timing of switch between the switching mode period and the on-keeping mode period (hereinafter, referred to as an "operation mode switching timing") of the semiconductor switch elements by the delay time for a timing at which the polarity of the input voltage is switched.

On the other hand, for example, in the case of generating a sine wave synchronized with the input voltage from an output signal of the detection circuit by using a calculation unit such as a microcomputer, a synchronized sine wave of the input voltage can be generated by calculation with a phase shifted by the signal transmission delay time in the detection circuit. However, in the case of generating the synchronized sine wave by the calculation as described above, for example, when a frequency of the input voltage fluctuates, the input voltage is not correctly estimated if the convergence speed of the calculation is not sufficiently fast with respect to the fluctuation speed of the frequency and a deviation is generated between a timing at which the polarity of the generated synchronized sine wave is switched and a timing at which the polarity of the input voltage is switched. Accordingly, a deviation is generated between the timing at which the polarity of the input voltage is switched and the operation mode switching timing of the semiconductor switch elements.

Furthermore, in the normal time at which the deviation described above is not generated, a current path is operated by controlling the semiconductor switch element, through which a feedback current constantly flows, in an on-keeping mode and by controlling another semiconductor switch element, into which a current flows from the AC power source only in an ON state, so as to operate in a switching mode, according to the polarity of the input voltage. In this case, when the deviation is generated between the timing at which the polarity of the input voltage is switched and the operation mode switching timing of the semiconductor switch elements, the semiconductor switch element into which the current flows from the AC power source only in the ON state is controlled in the on-keeping mode; and thus, the current path is not operated and the feedback current continuously flows through the semiconductor switch element operated in the switching mode. More specifically, as shown in FIG. 12A and FIG. 12C, when the semiconductor switch element into which the current flows from the AC power source only in the ON state is controlled in the on-keeping mode, the current flows through only a short-circuiting path in the AC power source without depending on the ON/OFF state of the semiconductor switch element operated in the switching mode. Thus, an excessive current is continuously inputted from the AC power source during this period. Accordingly, a problem exists in that, in the timing at which the polarity of the input voltage is switched, the circuit is damaged by the excessive current or a circuit for the purpose of protective measures against the excessive current is needed and thus the size of the rectification device is increased. Furthermore, a problem also exists in that the power factor deteriorates due to the generation of the excessive current.

The present invention has been made to solve the above described problem, and an object of the present invention is to provide a rectification device which prevents a circuit from being damaged and does not deteriorate a power factor even when a short-circuiting in an AC power source, the short-circuiting being caused by the switching state of a semiconductor switch element, is likely to be generated.

Means for Solving the Problems

In order to solve the foregoing problem, a rectification device according to a first aspect of the present invention includes: a rectification circuit forming a quadrilateral bridge type circuit whose adjacent two sides on the side through which a feedback current flows to an AC power source are composed of switch elements, and the other two sides are composed of rectification elements; an input voltage detector which detects an input voltage from the AC power source; an input current detector which detects an input current from the AC power source; and a control circuit which generates a synchronized sine wave synchronized with the input voltage, generates an input current target value based on the synchronized sine wave, and controls the switch elements by modulating the pulse widths of pulse signals according to a difference between the input current and the input current target value. In the rectification device, when any one of polarities of the input voltage, the input current, and the synchronized sine wave differs from other polarities, the control circuit executes any one of: performing switching operation of both of the switch elements; turning off a switch element, into which a current flows from the AC power source only in an ON state, of the switch elements; and turning off both of the switch elements.

Furthermore, a rectification device according to a second aspect of the present invention includes: a rectification circuit forming a quadrilateral bridge type circuit whose adjacent two sides on the side through which a feedback current flows to an AC power source are composed of switch elements, and the other two sides are composed of rectification elements; an input voltage detector which detects an input voltage from the AC power source; an input current detector which detects an input current from the AC power source; and a control circuit which generates a synchronized sine wave synchronized with the input voltage, generates an input current target value based on the synchronized sine wave, and controls the switch elements by modulating the pulse widths of pulse signals according to a difference between the input current and the input current target value. In the rectification device, when any two of the input voltage, the input current, and the synchronized sine wave are selected and polarities thereof differ, the control circuit executes any one of: performing switching operation of both of the switch elements; turning off a switch element, into which a current flows from the AC power source only in an ON state, of the switch elements; and turning off both of the switch elements.

Moreover, a rectification device according to a third aspect of the present invention includes: a rectification circuit forming a quadrilateral bridge type circuit whose adjacent two sides on the side through which a feedback current flows to an AC power source are composed of switch elements, and the other two sides are composed of rectification elements; an input voltage detector which detects an input voltage from the AC power source; an input current detector which detects an input current from the AC power source; and a control circuit which generates a synchronized sine wave synchronized with the input voltage, generates an input current target value based on the synchronized sine wave, and controls the switch elements by modulating the pulse widths of pulse signals according to a difference between the input current and the input current target value. In the rectification device, when an absolute value of the input voltage, the input current, and the synchronized sine wave is equal to or lower than a threshold value, the control circuit executes any one of: performing switching operation of both of the switch elements; turning off a switch element, into which a current flows from the AC power source only in an ON state, of the switch elements; and turning off both of the switch elements.

Additionally, a rectification device according to a fourth aspect of the present invention includes: a rectification circuit forming a quadrilateral bridge type circuit whose adjacent two sides on the side through which a feedback current flows to an AC power source are composed of switch elements, and the other two sides are composed of rectification elements; an input voltage detector which detects an input voltage from the AC power source; an input current detector which detects an input current from the AC power source; and a control circuit which generates a synchronized sine wave synchronized with the input voltage, generates an input current target value based on the synchronized sine wave, and controls the switch elements by modulating the pulse widths of pulse signals according to a difference between the input current and the input current target value. In the rectification device, when an absolute value of a time difference between a timing at which polarities of the input voltage, the input current, and the synchronized sine wave are reversed and a determination timing is equal to or lower than threshold values, the control circuit executes any one of: performing switching operation of both of the switch elements; turning off a switch element, into which a current flows from the AC power source only in an ON state, of the switch elements; and turning off both of the switch elements.

In addition, a rectification device according to a fifth aspect of the present invention includes: a rectification circuit forming a quadrilateral bridge type circuit whose adjacent two sides on the side through which a feedback current flows to an AC power source are composed of switch elements, and the other two sides are composed of rectification elements; an input voltage detector which detects an input voltage from the AC power source; an input current detector which detects an input current from the AC power source; and a control circuit which generates a synchronized sine wave synchronized with the input voltage, generates an input current target value based on the synchronized sine wave, and controls the switch elements by modulating the pulse widths of pulse signals according to a difference between the input current and the input current target value. In the rectification device, when an absolute value of a phase difference corresponding to a time difference between a timing at which polarities of the input voltage, the input current, and the synchronized sine wave are reversed and a determination timing is equal to or lower than a threshold value, the control circuit executes any one of: performing switching operation of both of the switch elements; turning off a switch element, into which a current flows from the AC power source only in an ON state, of the switch elements; and turning off both of the switch elements.

Advantageous Effect of the Invention

According to a rectification device of the present invention, a determination is made whether or not a short-circuiting in an AC power source, the short-circuiting being caused by the switching state of semiconductor switch elements, needs to be prevented; and when the determination is made that the short-circuiting prevention is necessary, the semiconductor switch elements are controlled so as not to continue the short-circuiting state in the AC power source, whereby it is effective that the size of the rectification device is not increased, the generation of an excessive current is suppressed, the circuit is prevented from being damaged, and a power factor can be improved.

BRIEF DESCRIPTION OF THE DRAWINGS

FIGS. 2A, 2B, 2C, 2D, 2E, 2F and 2G are views for explaining operation in the rectification device according to Embodiment 1;

FIGS. 3A, 3B, 3C and 3D are views each showing a current path in the rectification device according to Embodiment 1;

FIGS. 4A, 4B, 4C, 4D, 4E, 4F and 4G are views for explaining operation in a rectification device according to another embodiment of Embodiment 1;

FIGS. 5A, 5B, 5C, 5D, 5E, 5F and 5G are views for explaining operation in a rectification device according to further another embodiment of Embodiment 1;

FIGS. 6A, 6B, 6C, 6D, 6E and 6F are views for explaining operation in a rectification device according to Embodiment 2;

FIGS. 7A, 7B and 7C are views for explaining operation in a rectification device according to Embodiment 3;

FIGS. 8A, 8B and 8C are views for explaining operation in a rectification device according to Embodiment 4;

FIGS. 9A, 9B and 9C are views for explaining operation in a rectification device according to Embodiment 5;

FIGS. 11A, 11B, 11C, 11D and 11E are views for explaining operation in the conventional rectification device; and FIGS. 12A, 12B, 12C and 12D are views each showing a current path in the conventional rectification device.

MODE FOR CARRYING OUT THE INVENTION

Hereinafter, rectification device according to embodiments of the present invention will be described with reference to FIGS. 1 to 9C.
Embodiment 1.

Figure 1:
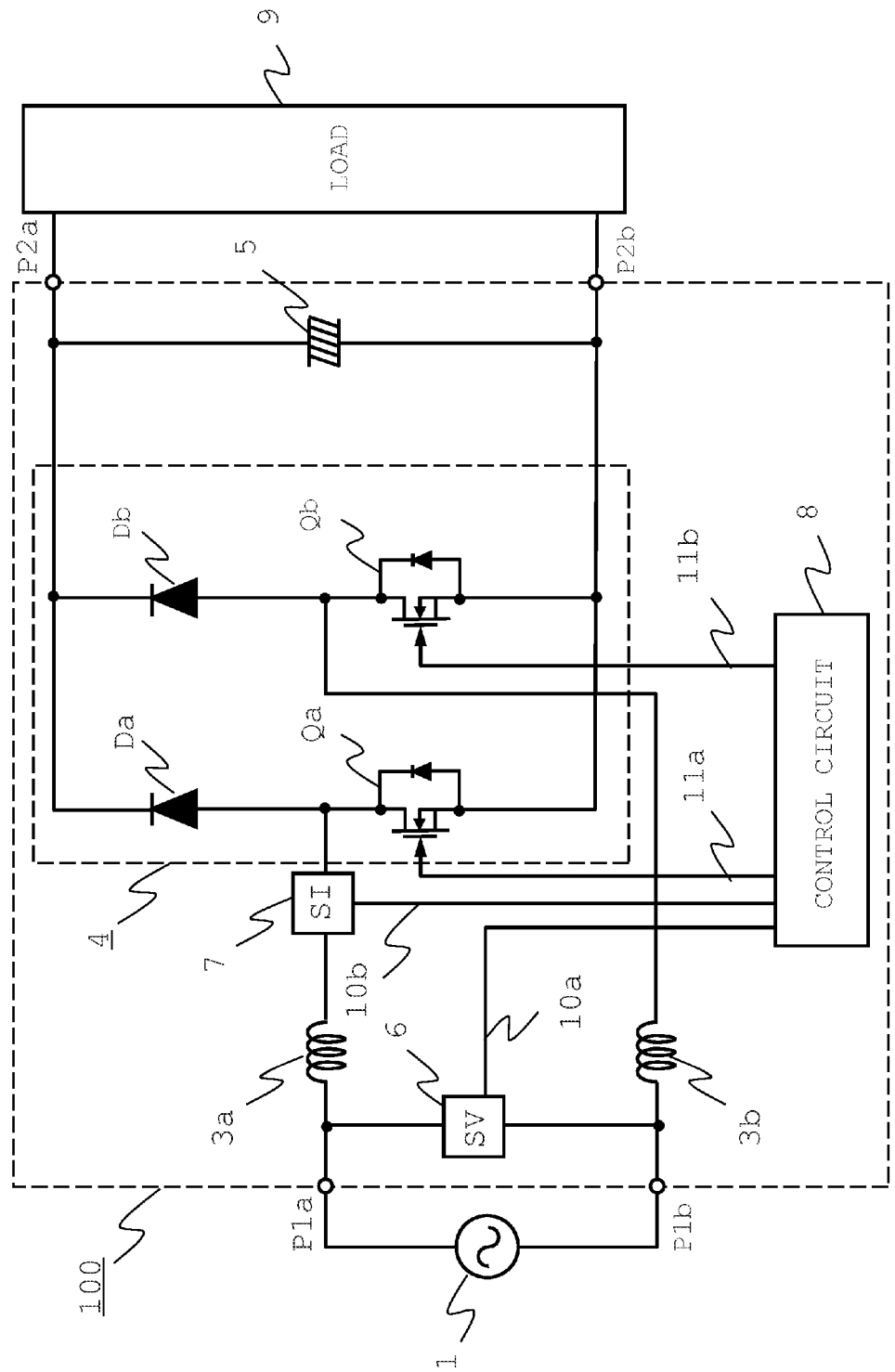
FIG. 1 is a diagram showing the circuit configuration of a rectification device according to Embodiment 1.

FIG. 1 is a diagram showing the circuit configuration of a rectification device according to Embodiment 1; FIGS. 2A to 2G are views for explaining the operation of the rectification device; and FIGS. 3A to 3D are views each showing a current path of the rectification device.

As shown in FIG. 1, a rectification device 100 includes: input terminals P1a, P1b which are connected to an AC power source 1 and to which an AC voltage is inputted; output terminals P2a, P2b which are connected to a load 9 and from which a predetermined DC voltage is outputted; a rectification circuit 4 forming a quadrilateral bridge type circuit which is composed of a first series circuit including a first semiconductor switch element Qa and a first rectification element Da, which are connected in parallel to the output terminals P2a, P2b, and a second series circuit including a second semiconductor switch element Qb and a second rectification element Db, which are connected in parallel to the output terminals P2a, P2b; a first reactor 3a inserted between a connection node between the first semiconductor switch element Qa and the first rectification element Da and the input terminal P1a of the AC power source 1; a second reactor 3b inserted between a connection node between the second semiconductor switch element Qb and the second rectification element Db and the input terminal P1b of the AC power source 1; an input voltage detector 6 provided between two input terminals P1a, P1b to detect an input voltage from the AC power source 1; an input current detector 7 provided between the connection node between the first semiconductor switch element Qa and the first rectification element Da and the input terminal P1a of the AC power source 1 in order to detect an input current Iac from the AC power source 1; and a smoothing capacitor 5 that constitutes a smoothing circuit connected in parallel to two output terminals P2a, P2b. Further, the rectification device 100 includes a control circuit 8 which obtains: a signal corresponding to an input voltage Vac from the input voltage detector 6 via a signal wire 10a and outputs a gate signal to the first semiconductor switch element Qa via a control wire 11a; and a signal corresponding to the input current Iac from the input current detector 7 via a signal wire 10b and outputs a gate signal to the second semiconductor switch element Qb via a control wire 11b.

Incidentally, as for the reactors, only either of the first reactor 3a or the second reactor 3b may be inserted.

Next, the operation of the rectification device 100 according to Embodiment 1 will be described using FIGS. 1 to 3D.

First, the control circuit 8 generates a synchronized sine wave Vsyn serving as a sine wave signal synchronized with the input voltage Vac from an input voltage detection value detected by the input voltage detector 6. Furthermore, the control circuit 8 generates an input current target value based on the synchronized sine wave Vsyn, modulates the pulse widths (pulse width modulation (PWM)) of pulse signals that control the first semiconductor switch element Qa and the second semiconductor switch element Qb at a switching mode according to a difference between the input current detection value detected by the input current detector 7 and the input current target value, and changes an ON/OFF ratio.

As described above, the input current Iac is controlled so as to come close to the input current target value by operating the first semiconductor switch element Qa and the second semiconductor switch element Qb while changing the ON/OFF ratio.

Further, the control circuit 8 determines whether or not a short-circuiting in the AC power source 1 needs to be prevented, the short-circuiting being caused by the switching state of the first semiconductor switch element Qa and the second semiconductor switch element Qb. More specifically, the control circuit 8 determines whether or not short the short-circuiting in the AC power source 1 needs to be prevented (determination of the necessity of short-circuiting prevention), the short-circuiting being caused by a deviation between a timing at which the polarity of the input voltage Vac is reversed and an operation mode switching timing of the first semiconductor switch element Qa and the second semiconductor switch element Qb.

Next, the operation of the first semiconductor switch element Qa and the second semiconductor switch element Qb and a short-circuiting prevention method will be described using FIGS. 2A to 2G and FIGS. 3A to 3D. FIGS. 2A to 2G are a waveform view showing the input voltage Vac of the rectification device 100; a synchronized sine wave Vsyn generated based on the input current Iac and the input voltage Vac; the determination result of the necessity of short-circuiting prevention with respect to the polarities of the input voltage Vac, the input current Iac, and the synchronized sine wave Vsyn; and the switch state of the first semiconductor switch element Qa and the second semiconductor switch element Qb. FIGS. 3(a) to 3(d) are views each showing a current path corresponding to periods of A to D in FIG. 2, respectively.

First, the periods (the period B and the period D of FIG. 2A) determined by the control circuit 8 as "short-circuiting prevention is not necessary (unnecessary for short-circuiting prevention)" will be described. In this case, the control circuit 8 controls so that either of the first semiconductor switch element Qa or the second semiconductor switch element Qb certainly operates in an on-keeping mode in accordance with the polarity of the synchronized sine wave Vsyn. More specifically, the control circuit 8 controls the semiconductor switch element, through which a feedback current to the AC power source 1 constantly and continuously flows regardless of an ON/OFF state, so as to operate in the on-keeping mode and controls another semiconductor switch element so as to operate in the switching mode. Thus, when the polarity of the synchronized sine wave Vsyn is positive, the input voltage Vac is also a positive voltage if the phase of the synchronized sine wave Vsyn is matched with the phase of the input voltage Vac. Then, as shown in FIG. 3B, the feedback current to the AC power source 1 constantly and continuously flows through the second semiconductor switch element Qb regardless of the ON/OFF state of the first semiconductor switch element Qa in the period B shown in FIG. 2; and therefore, the control circuit 8 controls the second semiconductor switch element Qb so as to operate in the on-keeping mode and controls the first semiconductor switch element Qa so as to operate in the switching mode. Furthermore, when the polarity of the synchronized sine wave Vsyn is negative, the input voltage Vac is also a negative voltage if the phase of the synchronized sine wave Vsyn is matched with the phase of the input voltage Vac. Then, as shown in FIG. 3D, the feedback current to the AC power source 1 constantly and continuously flows through the first semiconductor switch element Qa in the period D shown in FIG. 2A; and therefore, the control circuit 8 controls the first semiconductor switch element Qa so as to operate in the on-keeping mode and controls the second semiconductor switch element Qb so as to operate in the switching mode.

Figure 10:
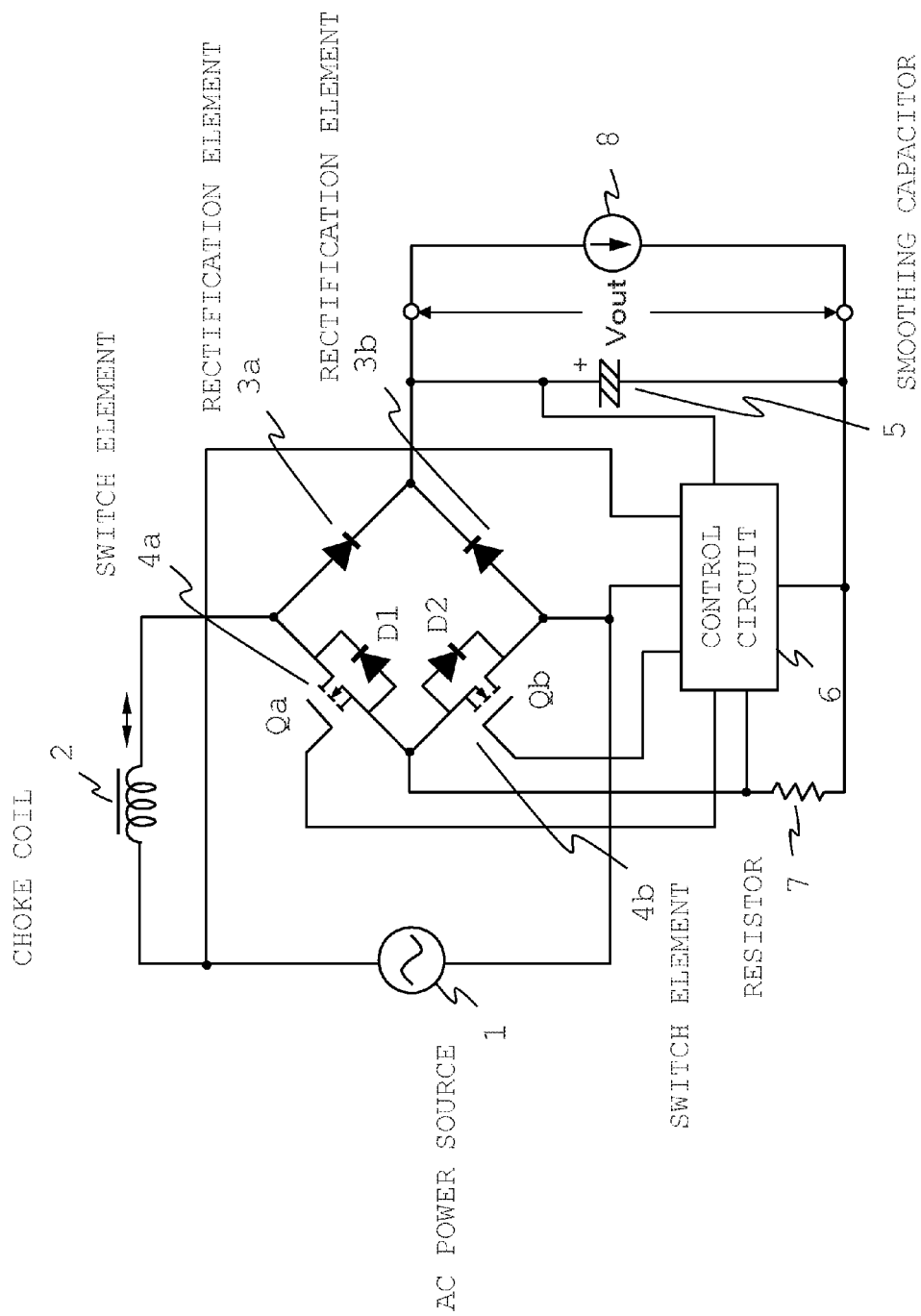
FIG. 10 is a view showing the circuit configuration of a conventional rectification device.

A control method in this case is the same as a normal control method shown in a period B and a period D of FIG. 11A in the conventional rectification device (see FIG. 10) in which the aforementioned determination of the necessity of the short-circuiting prevention is not performed. More specifically, the control method is the method of switching between operation modes of the first semiconductor switch element Qa and the second semiconductor switch element Qb in accordance with only the polarity of the synchronized sine wave. Furthermore, a current path shown in FIG. 12B is the same as the current path shown in FIG. 3B; and a current path shown in FIG. 12D is the same as the current path shown in FIG. 3D.

However, in the conventional rectification device, when a deviation between the phase of an input voltage Vac and the phase of a synchronized sine wave Vsyn is generated due to, for example, a rapid change in frequency of the input voltage, there generates a period at which the polarity of the input voltage Vac and the polarity of the synchronized sine wave Vsyn are reversed as shown in the period A and the period C of FIG. 11A. In the period A of FIG. 11A, the polarity of the input voltage Vac is positive, but the polarity of the synchronized sine wave Vsyn is negative; and thus, the first semiconductor switch element Qa operates in the on-keeping mode and the second semiconductor switch element Qb operates in the switching mode. However, as shown in FIG. 12A, the feedback current to the AC power source 1 constantly flows through the second semiconductor switch element Qb regardless of the ON/OFF state of the second semiconductor switch element Qb. Thus, the first semiconductor switch element Qa operates in the on-keeping mode and accordingly the current flows only through a path in which the AC power source 1 is short-circuited and an excessive current is generated. Furthermore, in the period C of FIG. 11A, the polarity of the input voltage Vac is negative, but the polarity of the synchronized sine wave Vsyn is positive; and thus, the first semiconductor switch element Qa operates in the switching mode, but the second semiconductor switch element Qb operates in the on-keeping mode. Thus, as shown in FIG. 12C, the feedback current to the AC power source 1 constantly flows through the first semiconductor switch element Qa. Thus, the current flows through only the path in which the AC power source 1 is short-circuited and accordingly an excessive current is also generated.

More specifically, in the case where there exists a period at which the polarity of the input voltage Vac and the polarity of the synchronized sine wave Vsyn are reversed, the AC power source 1 becomes a short-circuiting state when a semiconductor switch element that operates in the on-keeping mode is determined in accordance with only the polarity of the synchronized sine wave Vsyn.

On the other hand, in the control circuit 8 in the present Embodiment 1, as shown in FIGS. 2A to 2G, when one polarity differs from other two polarities of the polarities of the input voltage detection value, the input current detection value, and the synchronized sine wave, a determination is made as "short-circuiting prevention is necessary (necessary for short-circuiting prevention)." As described above, when the determination of the necessity of short-circuiting prevention is performed and either of the first semiconductor switch element Qa or the second semiconductor switch element Qb is operated in the on-keeping mode, the generation of an excessive current can be suppressed by controlling the semiconductor switch element, which short-circuits the AC power source 1 regardless of the switching state of another semiconductor switch element, so as not to operate in the on-keeping mode. Incidentally, when all the polarities of the input voltage detection value, the input current detection value, and the synchronized sine wave are matched, a determination is made as "short-circuiting prevention is not necessary (unnecessary for short-circuiting prevention)" in the control circuit 8; and as described above, the first semiconductor switch element Qa and the second semiconductor switch element Qb are controlled in accordance with the polarity of the synchronized sine wave Vsyn as shown in the period B and the period D of FIG. 2A.

Subsequently, the operation of the first semiconductor switch element Qa and the second semiconductor switch element Qb in the case where the determination is made as "short-circuiting prevention is necessary (necessary for short-circuiting prevention)" in the control circuit 8 will be described. As shown in the period A and the period C of FIG.

2A, when the determination is made as "short-circuiting prevention is necessary (necessary for short-circuiting prevention)" by the control circuit 8, both of the first semiconductor switch element Qa and the second semiconductor switch element Qb are controlled so as to operate in the switching mode. In this case, the first semiconductor switch element Qa and the second semiconductor switch element Qb are switching-controlled by the control circuit 8 while changing at the same ON/OFF ratio to control the input current Iac. With this, in the periods (the period A and the period C of FIG. 2A) at which the polarity of the input voltage Vac and the polarity of the synchronized sine wave Vsyn are reversed, when either of the first semiconductor switch element Qa or the second semiconductor switch element Qb is operated in the on-keeping mode, the semiconductor switch element, which short-circuits the AC power source 1 regardless of the switching state of another semiconductor switch element, is operated in the on-keeping mode; and therefore, the short-circuiting in state of the AC power source 1 is prevented and the generation of the excessive current can be suppressed as shown in FIG. 3A and FIG. 3B.

Furthermore, the input current Iac is controlled so as to be a sine wave similar to that of the input voltage Vac; and therefore, a timing at which the polarity of the input current Iac is reversed is substantially equal to the timing at which the polarity of the input voltage Vac is reversed. Therefore, even when the detection accuracy of the input voltage detector 6 is low and there generates a detection error about the timing at which the polarity of the input voltage Vac is reversed, the timing at which the polarity of the input voltage Vac is reversed can be indirectly detected by adding the input current as a determination element; and therefore, more reliable determination of the necessity of short-circuiting prevention can be performed.

Incidentally, in the present embodiment, the input voltage, the input current, and the synchronized sine wave serve as determination elements; and when the polarity of at least one determination element differs from other two polarities, the determination is made as "short-circuiting prevention is necessary (necessary for short-circuiting prevention)." However, the determination element is not limited to this, but it may be permissible if the determination element is a sine wave synchronized with the input voltage Vac. Then, at least two or more of the sine waves synchronized with the input voltage Vac serve as the determination elements; and when the polarity of at least one determination element differs from the polarities of other determination elements, a determination may be made as "short-circuiting prevention is necessary (necessary for short-circuiting prevention)."

Furthermore, in the present embodiment, when the determination is made as "short-circuiting prevention is necessary (necessary for short-circuiting prevention)" in the control circuit 8, both of the first semiconductor switch element Qa and the second semiconductor switch element Qb are controlled by the control circuit 8 so as to operate in the switching mode. However, in other embodiment shown in FIGS. 4A to 4G, when either of the first semiconductor switch element Qa or the second semiconductor switch element Qb is operated in the on-keeping mode, the semiconductor switch element, which short-circuits the AC power source 1 regardless of the switching state of another semiconductor switch element, may be controlled so as to turn off.

Moreover, during the period at which the determination is made as "short-circuiting prevention is necessary (necessary for short-circuiting prevention)," when at least either of the first semiconductor switch element Qa or the second semiconductor switch element Qb is operated in the on-keeping mode, the semiconductor switch element, which short-circuits the AC power source 1, may be controlled so as to turn off. Therefore, in further another embodiment shown in FIGS. 5A to 5G, both of the first semiconductor switch element Qa and the second semiconductor switch element Qb may be controlled so as to turn off.

As described above, in the rectification device according to Embodiment 1, the polarities of the input voltage, the input current, and the synchronized sine wave serve as the determination elements and when the polarity of one determination element differs from the polarities of other determination elements, the determination is made that the short-circuiting in the AC power source needs to be prevented. Then, the first semiconductor switch element and the second semiconductor switch element are controlled so as not to continue the short-circuiting state of the AC power source, the short-circuiting being caused by the switching state of the first semiconductor switch element and the second semiconductor switch element; and therefore, the generation of the excessive current is suppressed, the circuit is prevented from being damaged, and a power factor can be improved.

Embodiment 2.

FIGS. 6A to 6F are views for explaining the operation of a rectification device according to Embodiment 2. A different point between the operation of the present Embodiment 2 and the operation of Embodiment 1 is as follows: in the rectification device according to Embodiment 1, the polarities of the input voltage, the input current, and the synchronized sine wave serve as three determination elements and when the polarity of one determination element differs from the polarities of other determination elements, the determination is made that the short-circuiting in the AC power source needs to be prevented; whereas, in the operation of Embodiment 2, two of an input voltage Vac, an input current Iac, and a synchronized sine wave Vsyn are selected and when the polarities of two determination elements are not matched, a determination is made as "short-circuiting prevention is necessary (necessary for short-circuiting prevention)." Incidentally, the configuration of the rectification device according to Embodiment 2 is the same as that of Embodiment 1 and their explanation will be omitted.

Next, the operation of the rectification device according to Embodiment 2 will be described using FIGS. 6A to 6F. In FIGS. 6B to 6D, description will be made on the case where, for example, the input voltage Vac and the synchronized sine wave Vsyn2 are used as two determination elements.

When the polarities of two determination elements of the input voltage Vac and the synchronized sine wave Vsyn are not matched, a determination is made as "short-circuiting prevention is necessary (necessary for short-circuiting prevention)." When the polarities of two determination elements are matched, a determination is made as "short-circuiting prevention is not necessary (unnecessary for short-circuiting prevention)" in the control circuit 8; and as shown in a period B and a period D of FIG. 6A, the first semiconductor switch element Qa and the second semiconductor switch element Qb are controlled in accordance with the polarity of the synchronized sine wave Vsyn.

Furthermore, when the polarities of two determination elements are not matched, the determination is made as "short-circuiting prevention is necessary (necessary for short-circuiting prevention)" in the control circuit 8; and as shown in a period A and a period C of FIG. 6A, both of the first semiconductor switch element Qa and the second semiconductor switch element Qb are controlled so as to operate in a switching mode.

As described above, in the rectification device according to Embodiment 2, two of the input voltage Vac, the input current Iac, and the synchronized sine wave Vsyn are selected and when the polarities of two determination elements are not matched, the determination is made that the short-circuiting in the AC power source needs to be prevented and the first semiconductor switch element and the second semiconductor switch element are controlled so that the short circuit state of the AC power source, the short-circuiting being caused by the switching state of the first semiconductor switch element and the second semiconductor switch element, does not continue. Therefore, the generation of an excessive current is suppressed, the circuit is prevented from being damaged, and a power factor can be improved.

Embodiment 3.

FIGS. 7A to 7C are views for explaining the operation of a rectification device according to Embodiment 3. A different point between the operation of the present Embodiment 3 and the operation of Embodiment 1 is that, in Embodiment 1, the input voltage, the input current, and the synchronized sine wave serve as the determination elements of the necessity of short-circuiting prevention and when the polarity of at least one of the determination elements differs from the polarities of other determination elements, the determination is made as "short-circuiting prevention is necessary (necessary for short-circuiting prevention)"; whereas, in Embodiment 3, an input voltage and a synchronized sine wave serve as determination elements and when an absolute value of at least one of the determination elements is equal to or lower than a predetermined threshold value, a determination is made as "short-circuiting prevention is necessary (necessary for short-circuiting prevention)". Incidentally, the configuration of the rectification device according to Embodiment 3 is the same as that of Embodiment 1 and therefore their explanation will be omitted.

Next, the operation of the rectification device of Embodiment 3 will be described using FIGS. 7A to 7C. An input voltage Vac and a synchronized sine wave Vsyn serve as determination elements of the necessity of short-circuiting prevention and an absolute value is set as a determination threshold value for each determination element; and when an absolute value of at least either of the input voltage Vac or the synchronized sine wave Vsyn is equal to or lower than the relevant determination threshold value, the determination is made as "short-circuiting prevention is necessary (necessary for short-circuiting prevention)." For example, an input voltage determination threshold value $\Delta y1$ is set as the determination threshold value of the input voltage Vac and a synchronized sine wave determination threshold value $\Delta y2$ is set as the determination threshold value of the synchronized sine wave Vsyn. Then, when either of the absolute value of the input voltage Vac or the synchronized sine wave Vsyn is equal to or lower than the relevant determination threshold value, the determination is made as "short-circuiting prevention is necessary (necessary for short-circuiting prevention)."

In Embodiment 3, by the control circuit 8, the necessity of short-circuiting prevention is determined before and after a timing at which the polarity of the input voltage Vac is reversed and before and after a timing at which the polarity of the synchronized sine wave Vsyn is reversed, and the first semiconductor switch element Qa and the second semiconductor switch element Qb are controlled so that the short-circuiting state of the AC power source 1 does not continue. Therefore, even when a deviation is generated between the phase of the input voltage Vac and the phase of the synchronized sine wave Vsyn, the short-circuiting in the AC power source 1 can be prevented, the generation of an excessive current is suppressed, the circuit is prevented from being damaged, and a power factor can be improved. With this, in Embodiment 3, the accuracy of determination of the necessity of short-circuiting prevention near a reversal of the polarity can be improved and the generation of the short-circuiting state of the AC power source 1 can be more accurately suppressed.

Incidentally, in the present embodiment, the input voltage and the synchronized sine wave serve as the determination elements. However, the determination element is not limited to this, but it may be permissible if the determination element is a sine wave synchronized with the input voltage. Then, any one of the sine waves synchronized with the input voltage serves as the determination element and when an absolute value of the determination element is equal to or lower than a determination threshold value, a determination may be made as "short-circuiting prevention is necessary."

As described above, in the rectification device according to Embodiment 3, the polarities of the input voltage and the synchronized sine wave serve as the determination elements and when the absolute value of either of the determination elements is equal to or lower than the determination threshold value, the determination is made that the short-circuiting in the AC power source needs to be prevented and the first semiconductor switch element and the second semiconductor switch element are controlled so that the short-circuiting state of the AC power source, the short-circuiting being caused by the switching state of the first semiconductor switch element and the second semiconductor switch element, does not continue; and therefore, as in Embodiment 1, the generation of an excessive current is suppressed, the circuit is prevented from being damaged, and a power factor can be improved.

Embodiment 4.

FIGS. 8A to 8C are views for explaining the operation of a rectification device according to Embodiment 4. A different point between the operation of the present Embodiment 4 and the operation of Embodiment 1 is that, in Embodiment 1, the input voltage, the input current, and the synchronized sine wave serve as the determination elements of the necessity of short-circuiting prevention and when the polarity of at least one determination element of the determination elements differs from the polarities of other determination elements, the determination is made as "short-circuiting prevention is necessary (necessary for short-circuiting prevention)"; whereas, in Embodiment 4, an input voltage and a synchronized sine wave serve as determination elements and when an absolute value of a time difference between a timing at which the polarity of at least one determination element is reversed and a determination timing is equal to or lower than a predetermined time difference threshold value, a determination is made as "short-circuiting prevention is necessary (necessary for short-circuiting prevention)." Incidentally, the configuration of the rectification device according to Embodiment 4 is the same as that of Embodiment 1 and therefore their explanation will be omitted.

Next, the operation of the rectification device according to Embodiment 4 will be described using FIGS. 8A to 8C. An input voltage Vac and a synchronized sine wave Vsyn serve as determination elements of the necessity of short-circuiting prevention. Then, the time difference between the timing at which the polarity of each determination element is reversed and the determination timing is set as the time difference threshold value of each determination element; and when an absolute value of the time difference between the timing at which at least either polarity of the input voltage Vac or the synchronized sine wave Vsyn is reversed and the determination timing is equal to or lower than the relevant time difference threshold value, the determination is made as "short-circuiting prevention is necessary (necessary for short-circuiting prevention)." For example, an input voltage time difference threshold value Δt1 is set as the time difference threshold value of the input voltage Vac and a synchronized sine wave time difference threshold value t2 is set as the time difference threshold value of the synchronized sine wave Vsyn; and when either of the absolute value of the time difference between the timing at which the polarity of the input voltage Vac or the synchronized sine wave Vsyn is reversed and the determination timing is equal to or lower than the relevant time difference threshold value, the determination is made as "short-circuiting prevention is necessary (necessary for short-circuiting prevention)."

The determination timing is at least a period equal to or lower than a control period of the semiconductor switch element, and the determination is made at the timing of each determination period T with the elapse of time. That is, the time difference between the determination timing and the timing at which the polarity of the synchronized sine wave is reversed becomes small with the elapse of time; and when the absolute value of the time difference is equal to or lower than the time difference threshold value, the determination is made as "short-circuiting prevention is necessary (necessary for short-circuiting prevention)."

More specifically, when the determination is performed at a determination timing t1, a time difference between the determination timing t1 and the timing at which the polarity of the input voltage Vac is reversed is equal to or lower than the time difference threshold value Δt1; and therefore, the determination is made as "short-circuiting prevention is necessary (necessary for short-circuiting prevention)." The determination is repeatedly performed for each determination period T; and a time difference between a determination timing t2 and the timing at which the polarity of the input voltage Vac is reversed is equal to or higher than the time difference threshold value Δt1 at the determination timing t2; however, a time difference between the determination timing t2 and the timing at which the polarity of the synchronized sine wave Vsyn is reversed is equal to or lower than the time difference threshold value Δt2; and thus, the result of the determination is continued as "short-circuiting prevention is necessary (necessary for short-circuiting prevention)." Further, the determination is repeatedly performed for each determination period T; and a time difference between a determination timing t3 and the timing at which the polarity of the synchronized sine wave Vsyn is reversed is also equal to or higher than the time difference threshold value Δt2 at the determination timing t3; and thus, a determination is made as "short-circuiting prevention is not necessary (unnecessary for short-circuiting prevention)."

Also in Embodiment 4, by the control circuit 8, the necessity of short-circuiting prevention is determined before and after the timing at which the polarity of the input voltage Vac is reversed and before and after the timing at which the polarity of the synchronized sine wave Vsyn is reversed, and the first semiconductor switch element Qa and the second semiconductor switch element Qb are controlled so that the short-circuiting state of the AC power source 1 does not continue. Therefore, even when a deviation is generated between the phase of the input voltage Vac and the phase of the synchronized sine wave Vsyn, the short-circuiting in the AC power source 1 can be prevented, the generation of an excessive current is suppressed, the circuit is prevented from being damaged, and a power factor can be improved. With this, in Embodiment 4, the accuracy of determination of the necessity of short-circuiting prevention near a reversal of the polarity can be improved and the generation of the short-circuiting state of the AC power source 1 can be more accurately suppressed.

Incidentally, in the present embodiment, the input voltage and the synchronized sine wave serve as the determination elements. However, the determination element is not limited to this, but it may be permissible if the determination element is a sine wave synchronized with the input voltage. Then, any one of the sine waves synchronized with the input voltage serves as the determination element and when an absolute value of a time difference between a timing at which the polarity of the determination element is reversed and a determination timing is equal to or lower than the time difference threshold value, a determination may be made as "short-circuiting prevention is necessary (necessary for short-circuiting prevention)."

As described above, in the rectification device according to Embodiment 4, the polarities of the input voltage and the synchronized sine wave serve as the determination elements and when the absolute value of the time difference between the timing at which the polarity of either of the determination elements is reversed and the determination timing is equal to or lower than the time difference threshold value, the determination is made that the short-circuiting in the AC power source needs to be prevented and the first semiconductor switch element and the second semiconductor switch element are controlled so that the short-circuiting state of the AC power source, the short-circuiting being caused by the switching state of the first semiconductor switch element and the second semiconductor switch element, does not continue; and therefore, the generation of an excessive current is suppressed, the circuit is prevented from being damaged, and a power factor can be improved, as in Embodiment 1.

Embodiment 5.

FIGS. 9A to 9C are views for explaining the operation of a rectification device according to Embodiment 5. A different point between the operation of the present Embodiment 5 and the operation of Embodiment 1 is that, in Embodiment 1, the input voltage, the input current, and the synchronized sine wave serve as the determination factor elements of the necessity of short-circuiting prevention and when the polarity of at least one determination element of the determination elements differs from the polarities of other determination elements, the determination is made as "short-circuiting prevention is necessary (necessary for short-circuiting prevention)"; whereas, in Embodiment 5, an input voltage and a synchronized sine wave serve as determination elements and when an absolute value of a phase difference corresponding to a time difference between a timing at which the polarity of at least one determination element is reversed and a determination timing is equal to or lower than a predetermined phase difference threshold value, a determination is made as "short-circuiting prevention is necessary (necessary for short-circuiting prevention)." Incidentally, the configuration of the rectification device according to Embodiment 5 is the same as that of Embodiment 1 and therefore their explanation will be omitted.

Next, the operation of the rectification device according to Embodiment 5 will be described using FIGS. 9A to 9C. An input voltage Vac and a synchronized sine wave Vsyn serve as determination elements of the necessity of short-circuiting prevention. Then, the phase difference between the timing at which the polarity of each determination element is reversed and the determination timing is set as the phase difference threshold value of each determination element; and when an absolute value of the phase difference between the timing at which at least either polarity of the input voltage Vac or the synchronized sine wave Vsyn is reversed and the determination timing is equal to or lower than the phase difference threshold value, the determination is made as "short-circuiting prevention is necessary (necessary for short-circuiting prevention)." For example, an input voltage phase difference threshold value Δθ1 is set as the phase difference threshold value of the input voltage Vac and a synchronized sine wave phase difference threshold value Δθ2 is set as the phase difference threshold value of the synchronized sine wave Vsyn; and when either of the absolute value of the phase difference between the timing at which the polarity of the input voltage Vac or the synchronized sine wave Vsyn is reversed and the determination timing is equal to or lower than the phase difference threshold value, the determination is made as "short-circuiting prevention is necessary (necessary for short-circuiting prevention)." The determination timing is the same as that of Embodiment 4.

Also in Embodiment 5, by the control circuit 8, the necessity of short-circuiting prevention is determined before and after the timing at which the polarity of the input voltage Vac is reversed and before and after the timing at which the polarity of the synchronized sine wave Vsyn is reversed, and the first semiconductor switch element Qa and the second semiconductor switch element Qb are controlled so that the short-circuiting state of the AC power source 1 does not continue. Therefore, even when a deviation is generated between the phase of the input voltage Vac and the phase of the synchronized sine wave Vsyn, the short-circuiting in the AC power source 1 can be prevented, the generation of an excessive current is suppressed, the circuit is prevented from being damaged, and a power factor can be improved. With this, in Embodiment 5, the accuracy of determination of the necessity of short-circuiting prevention near a reversal of the polarity can be improved and the generation of the short-circuiting state of the AC power source 1 can be more accurately suppressed.

Incidentally, in the present embodiment, the input voltage and the synchronized sine wave serve as the determination elements. However, the determination element is not limited to this, but it may be permissible if the determination element is a sine wave synchronized with the input voltage. Then, any one of the sine waves synchronized with the input voltage serves as the determination element and when the absolute value of a phase difference corresponding to a time difference between a timing at which the polarity of the determination element is reversed and a determination timing is equal to or lower than the phase difference threshold value, a determination may be made as "short-circuiting prevention is necessary (necessary for short-circuiting prevention)."

As described above, in the rectification device according to Embodiment 5, the polarities of the input voltage and the synchronized sine wave serve as the determination elements and when the absolute value of the phase difference between the timing at which the polarity of either of the determination elements is reversed and the determination timing is equal to or lower than the phase difference threshold value, the determination is made that the short-circuiting in the AC power source needs to be prevented and the first semiconductor switch element and the second semiconductor switch element are controlled so that the short-circuiting state of the AC power source, the short-circuiting being caused by the switching state of the first semiconductor switch element and the second semiconductor switch element, does not continue; and therefore, the generation of an excessive current is suppressed, the circuit is prevented from being damaged, and a power factor can be improved, as in Embodiment 1.

Incidentally, the present invention can freely combine the respective embodiments and appropriately change or omit the respective embodiments, within the scope of the present invention.

In addition, the same reference numerals as those shown in the drawings represent the same or corresponding elements.

The invention claimed is:

1. A rectification device comprising:
a rectification circuit forming a quadrilateral bridge type circuit, the rectification circuit including switching elements, through which a feedback current flows to an alternating current (AC) power source, and rectification elements;
an input voltage detector which detects an input voltage from said AC power source;
an input current detector which detects an input current from said AC power source; and
a control circuit which generates a synchronized sine wave synchronized with the input voltage, generates an input current target value based on the synchronized sine wave, and controls said switch elements by modulating pulse widths of pulse signals according to a difference between the input current and the input current target value,
wherein when one of a polarity of the input voltage, a polarity of the input current, and a polarity of the synchronized sine wave differs from the other polarities, said control circuit executes one of:
performing switching operation of the switch elements;
turning off one of the switch elements, the switch element allowing current to flow from said AC power source to the switch element only when the switch element is in an ON state; and
turning off the switch elements.

2. A rectification device comprising:
a rectification circuit forming a quadrilateral bridge type circuit, the rectification circuit including switching elements, through which a feedback current flows to an alternating current (AC) power source, and rectification elements;
an input voltage detector which detects an input voltage from said AC power source;
an input current detector which detects an input current from said AC power source; and
a control circuit which generates a synchronized sine wave synchronized with the input voltage, generates an input current target value based on the synchronized sine wave, and controls said switch elements by modulating pulse widths of pulse signals according to a difference between the input current and the input current target value,
wherein when two polarities selected from a polarity of the input voltage, a polarity of the input current, and a polarity of the synchronized sine wave are different from each other, said control circuit executes one of:

performing switching operation of the switch elements;
turning off one of the switch elements, the switch element allowing current to flow from said AC power source to the switch element only when the switch element is in an ON state; and
turning off the switch elements.

3. A rectification device comprising:
a rectification circuit forming a quadrilateral bridge type circuit, the rectification circuit including switching elements, through which a feedback current flows to an alternating current (AC) power source, and rectification elements;
an input voltage detector which detects an input voltage from said AC power source;
an input current detector which detects an input current from said AC power source; and
a control circuit which generates a synchronized sine wave synchronized with the input voltage, generates an input current target value based on the synchronized sine wave, and controls said switch elements by modulating pulse widths of pulse signals according to a difference between the input current and the input current target value,
wherein when an absolute value of at least one of the input voltage, the input current, and the synchronized sine wave is equal to or lower than a threshold value, said control circuit executes one of:
performing switching operation of the switch elements;
turning off one of the switch elements, the switch element allowing current to flow from said AC power source to the switch element only when the switch element is in an ON state; and
turning off the switch elements.

4. A rectification device comprising:
a rectification circuit forming a quadrilateral bridge type circuit, the rectification circuit including switching elements, through which a feedback current flows to an alternating current (AC) power source, and rectification elements;
an input voltage detector which detects an input voltage from said AC power source;
an input current detector which detects an input current from said AC power source; and
a control circuit which generates a synchronized sine wave synchronized with the input voltage, generates an input current target value based on the synchronized sine wave, and controls said switch elements by modulating pulse widths of pulse signals according to a difference between the input current and the input current target value,
wherein when an absolute value of a time difference between a timing at which polarities of the input voltage, the input current, and the synchronized sine wave are reversed and a determination timing is equal to or lower than a threshold value, said control circuit executes one of:
performing switching operation of the switch elements;
turning off one of the switch elements, the switch element allowing current to flow from said AC power source to the switch element only when the switch element is in an ON state; and
turning off the switch elements.

5. A rectification device comprising:
a rectification circuit forming a quadrilateral bridge type circuit, the rectification circuit including switching elements, through which a feedback current flows to an alternating current (AC) power source, and rectification elements;
an input voltage detector which detects an input voltage from said AC power source;
an input current detector which detects an input current from said AC power source; and
a control circuit which generates a synchronized sine wave synchronized with the input voltage, generates an input current target value based on the synchronized sine wave, and controls said switch elements by modulating the pulse widths of pulse signals according to a difference between the input current and the input current target value,
wherein when an absolute value of a phase difference corresponding to a time difference between a timing at which polarities of the input voltage, the input current, and the synchronized sine wave are reversed and a determination timing is equal to or lower than a threshold value, said control circuit executes one of:
performing switching operation of the switch elements;
turning off one of the switch elements, the switch element allowing current to flow from said AC power source to the switch element only when the switch element is in an ON state; and
turning off the switch elements.

* * * * *